United States Patent
Kasahara

(10) Patent No.: US 10,710,447 B2
(45) Date of Patent: Jul. 14, 2020

(54) HYBRID VEHICLE DRIVE SYSTEM

(71) Applicant: Honda Motor Co., Ltd., Tokyo (JP)

(72) Inventor: Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 16/353,897

(22) Filed: Mar. 14, 2019

(65) Prior Publication Data

US 2019/0291565 A1 Sep. 26, 2019

(30) Foreign Application Priority Data

Mar. 23, 2018 (JP) .................................. 2018-055597

(51) Int. Cl.
| | |
|---|---|
| *B60K 6/383* | (2007.10) |
| *B60W 20/10* | (2016.01) |
| *B60K 26/04* | (2006.01) |
| *B60W 10/02* | (2006.01) |
| *B60K 20/02* | (2006.01) |

(52) U.S. Cl.
CPC .............. *B60K 6/383* (2013.01); *B60K 20/02* (2013.01); *B60K 26/04* (2013.01); *B60W 10/02* (2013.01); *B60W 20/10* (2013.01); *B60K 2702/06* (2013.01)

(58) Field of Classification Search
None
See application file for complete search history.

(56) References Cited

U.S. PATENT DOCUMENTS

| | | | | |
|---|---|---|---|---|
| 8,196,687 | B2* | 6/2012 | Swales .................... | B60L 50/16 180/65.245 |
| 8,757,306 | B2* | 6/2014 | Kobayashi ............. | B60K 6/448 180/65.265 |
| 10,604,145 | B2* | 3/2020 | Kasahara ............... | B60W 10/02 |
| 2011/0220428 | A1* | 9/2011 | Ando ..................... | B60K 6/365 180/65.245 |
| 2019/0276006 | A1* | 9/2019 | Kasahara ................ | F16H 3/724 |
| 2019/0291714 | A1* | 9/2019 | Kasahara ............. | B60W 10/115 |
| 2019/0291717 | A1* | 9/2019 | Kasahara ............. | B60W 20/10 |
| 2019/0308628 | A1* | 10/2019 | Kasahara ............. | B60W 10/115 |
| 2019/0344652 | A1* | 11/2019 | Kasahara ................ | B60K 6/40 |

FOREIGN PATENT DOCUMENTS

JP            2003127679 A    5/2003

* cited by examiner

*Primary Examiner* — Dirk Wright
(74) *Attorney, Agent, or Firm* — Duft & Bornsen, PC

(57) ABSTRACT

A drive system of a hybrid vehicle including an internal combustion engine, a first motor-generator, a power transmission path, a power division mechanism, a second motor-generator, a one-way clutch, a mode change mechanism, and an electronic control unit having a microprocessor and memory. The microprocessor is configured to control the first motor-generator so as to reduce a reaction force acting on the first motor-generator at a time at which a state of the one-way clutch changes from an unlocked state to a locked state, when a drive mode is changed from an EV mode to a HV mode through a start mode by the mode change mechanism.

8 Claims, 12 Drawing Sheets

|  |  | BR | CL | OWY | ENG |
|---|---|---|---|---|---|
| EV MODE | | × | × | × | × |
| W MOTOR MODE | | × | ○ | ○ | × |
| SERIES MODE | | ○ | ○ | × | ○ |
| HV MODE | LOW | × | ○ | ○ | ○ |
| | HIGH | ○ | × | ○ | ○ |

EV MODE

W MOTOR MODE

SERIES MODE

HV LOW MODE

HV HIGH MODE

EV MODE

START MODE

START MODE – HV LOW MODE

HV LOW MODE

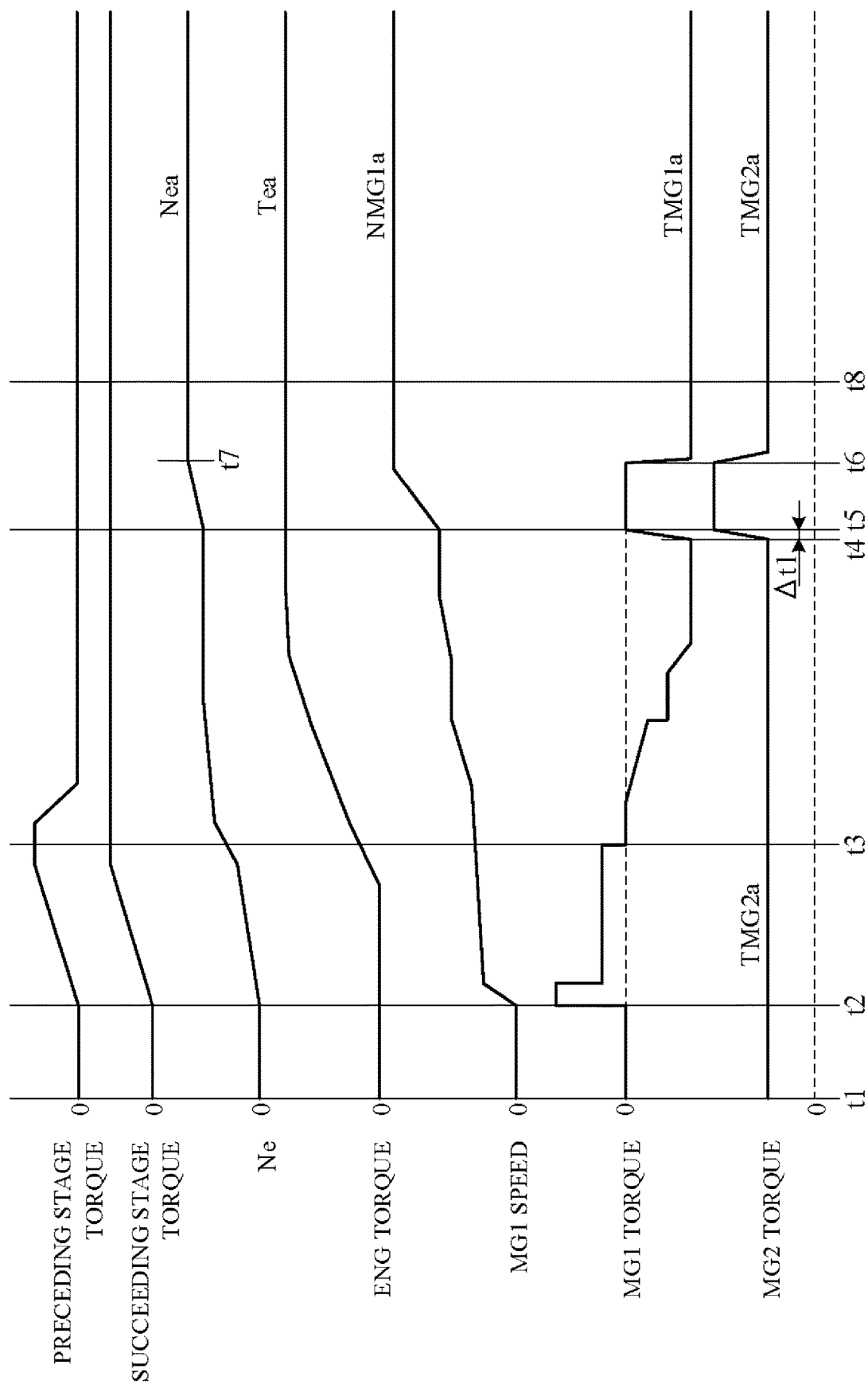

HYBRID VEHICLE DRIVE SYSTEM

CROSS-REFERENCE TO RELATED APPLICATION

This application is based upon and claims the benefit of priority from Japanese Patent Application No. 2018-055597 filed on Mar. 23, 2018, the content of which is incorporated herein by reference.

BACKGROUND OF THE INVENTION

Field of the Invention

This invention relates to a drive system of a hybrid vehicle.

Description of the Related Art

Conventionally, there is a known apparatus of this type that distributes motive power output from an engine through a power distribution mechanism to a first motor-generator and a vehicle drive shaft, and connects a second motor-generator to the wheel drive shaft. Such a unit is described in, for example, Japanese Unexamined Patent Publication No. 2003-127679 (JP2003-127679A). In the apparatus described in JP2003-127679A, a one-way clutch is provided between the power distribution mechanism and the second motor-generator, and after cranking of the engine by power of the first motor-generator via the power distribution mechanism, part of the power from the engine is transmitted through the one-way clutch to the wheel drive shaft.

The apparatus described in JP2003-127679A leads to a one-way clutch durability issue because the one-way clutch is locked and is therefore subject to an impact when part of the power from the engine is transmitted to the wheel drive shaft through the one-way clutch.

SUMMARY OF THE INVENTION

An aspect of the present invention is a drive system of a hybrid vehicle including: an internal combustion engine; a first motor-generator; a power transmission path including a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a one-way clutch interposed between an output shaft in the first power transmission path and an input shaft in the second power transmission path so that the output shaft and the input shaft integrally rotate in a locked state and the output shaft relatively rotates in relation to the input shaft in an unlocked state; a mode change mechanism provided in the first power transmission path to change a drive mode from an EV mode in which the hybrid vehicle is driven by a power of the second motor-generator with the internal combustion engine to a HV mode in which the hybrid vehicle is driven by the power of the second motor-generator and the power generated by the internal combustion engine through a start mode in which the internal combustion engine is started; and an electronic control unit including a microprocessor and a memory and configured to perform controlling the internal combustion engine, the first motor-generator, the second motor-generator and the mode change mechanism. The microprocessor is configured to perform the controlling including controlling the first motor-generator so as to reduce a reaction force acting on the first motor-generator, at a time at which a state of the one-way clutch changes from the unlocked state to the locked state, when the drive mode is changed from the start mode to the HV mode by the mode change mechanism.

BRIEF DESCRIPTION OF THE DRAWINGS

The objects, features, and advantages of the present invention will become clearer from the following description of embodiments in relation to the attached drawings, in which:

FIG. 12 is a timing chart showing an example of operation of the drive system of the hybrid vehicle according to the embodiment of the invention.

DETAILED DESCRIPTION OF THE INVENTION

Figure 1:
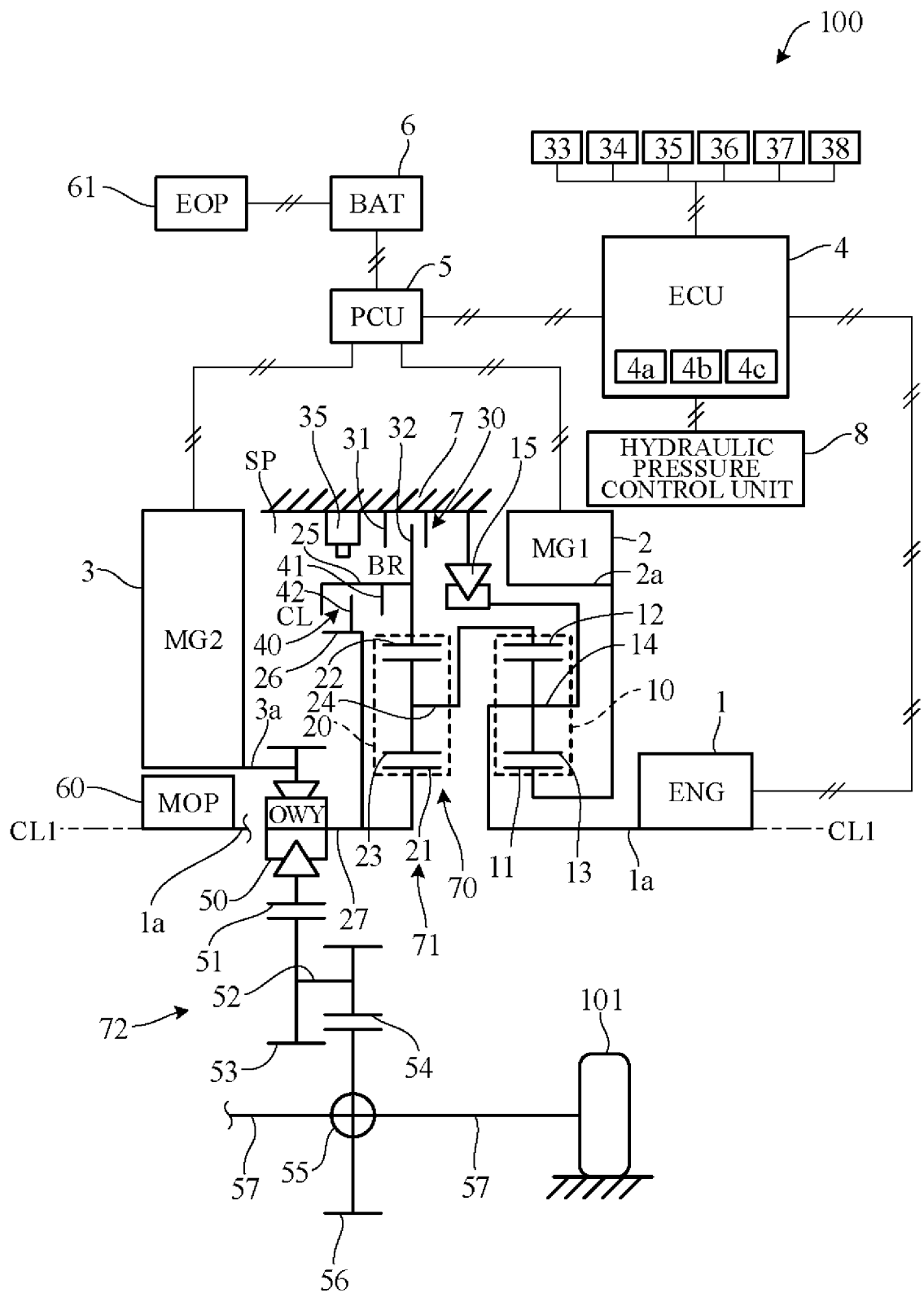
FIG. 1 is a diagram showing schematically a configuration overview of a drive system of a hybrid vehicle according to an embodiment of the invention.

Hereinafter, an embodiment of the present invention is explained with reference to FIGS. 1 to 12. A drive system according to an embodiment of the present invention is applied to a hybrid vehicle including an engine and a motor-generator as a drive power source. FIG. 1 is a diagram showing schematically a configuration overview of a drive system 100 according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 and the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to an output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage being shifted to high.

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage being shifted to low.

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27. Torque transmission path from the first planetary gear mechanism 10 to the output shaft 27 of upstream of the one-way clutch 50 through the speed change mechanism 70 configures a first power transmission path 71.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive system 100 can therefore be minimized, a smaller drive system 100 can be realized.

An oil pump (MOP) 60 is installed radially inward of the rotor of the second motor-generator 3. The oil pump 60 is connected to the output shaft 1a of the engine 1 and driven by the engine 1. Oil supply necessary when the engine 1 is stopped is covered by driving an electric pump (EOP) 61 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a second power transmission path 72 as a torque transmission path from the one-way clutch 50 to the axles 57. The first and second power transmission paths 71 and 72 are connected with each other in series.

The hydraulic pressure control unit 8 includes electromagnetic valve, proportional electromagnetic valve, and other control valves actuated in accordance with electric signals. These control valves operate to control hydraulic pressure flow to the brake mechanism 30, clutch mechanism 40 and the like in accordance with instructions from the controller 4. This enables ON-OFF switching of the brake mechanism 30 and clutch mechanism 40.

The controller (ECU) 4 as an electronic control unit incorporates an arithmetic processing unit having a CPU, ROM, RAM and other peripheral circuits, and the CPU includes an engine control ECU 4a, a speed change mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, a rotational speed sensor 33 for detecting rotational speed of the first motor-generator 2, a rotational speed sensor 34 for detecting rotational speed of the second motor-generator 3, a rotational speed sensor 35 for detecting rotational speed of the outer drum 25, a vehicle speed sensor 36 for detecting vehicle speed, an accelerator opening angle sensor 37 for detecting accelerator pedal opening angle indicative of amount of accelerator pedal depression, and an engine speed sensor 38 for detecting rotational speed of the engine 1.

Based on these input signals, the controller 4 decides drive mode in accordance with a predefined driving force map representing vehicle driving force characteristics defined in terms of factors such as vehicle speed and accelerator opening angle. In order to enable the vehicle to travel in the decided drive mode, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8 (control valve).

Figures 2, 3:
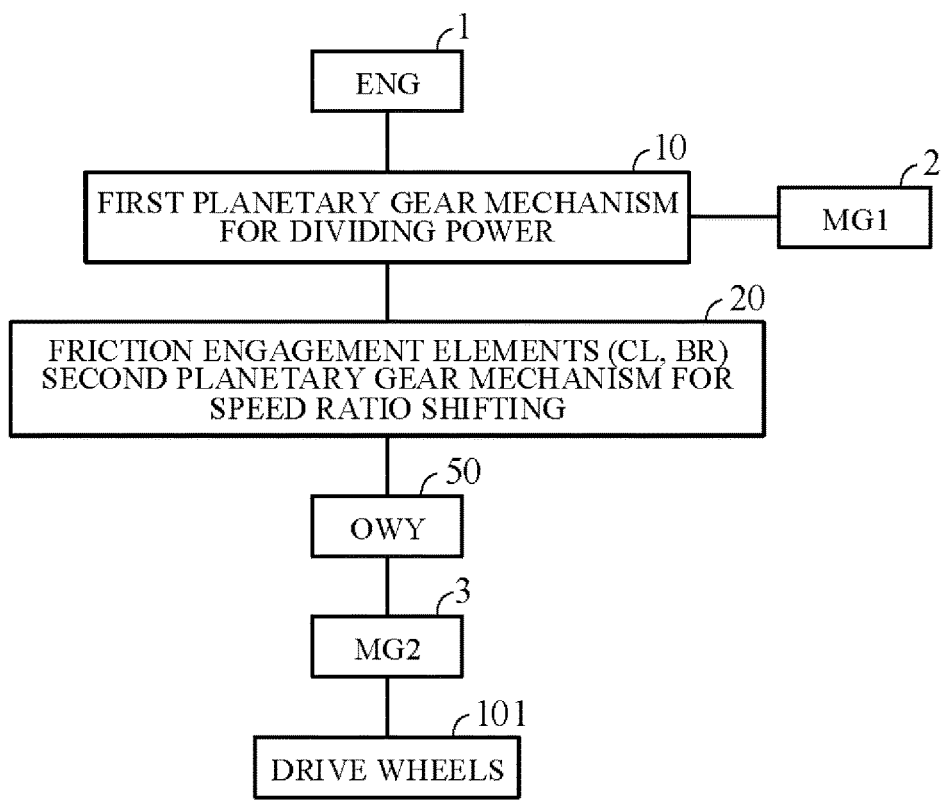
FIG. 2 is a diagram showing an interconnection of main components of the drive system of the hybrid vehicle according to the embodiment of the invention.
FIG. 3 is a diagram an example of drive modes implemented by the drive system of the hybrid vehicle according to the embodiment of the invention.

FIG. 2 is a drawing summarizing interconnection of main components of the drive system 100. As shown in FIG. 2, the first planetary gear mechanism 10 for dividing engine power is connected to the engine 1. The first motor-generator 2 and second planetary gear mechanism 20 for speed ratio shifting are connected to the first planetary gear mechanism 10. The second motor-generator 3 is connected through the one-way clutch 50 to the second planetary gear mechanism 20, and the front wheels 101 are connected to the second motor-generator 3 as drive wheels.

FIG. 3 is a table showing examples of some drive modes that can be implemented by the drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 3, EV mode, W motor mode, series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol ○, while brake mechanism 30 OFF (Disengaged), clutch mechanism 40 OFF (Disengaged), one-way clutch 50 Unlocked, and engine 1 Stopped are indicated by symbol x.

Figure 4:
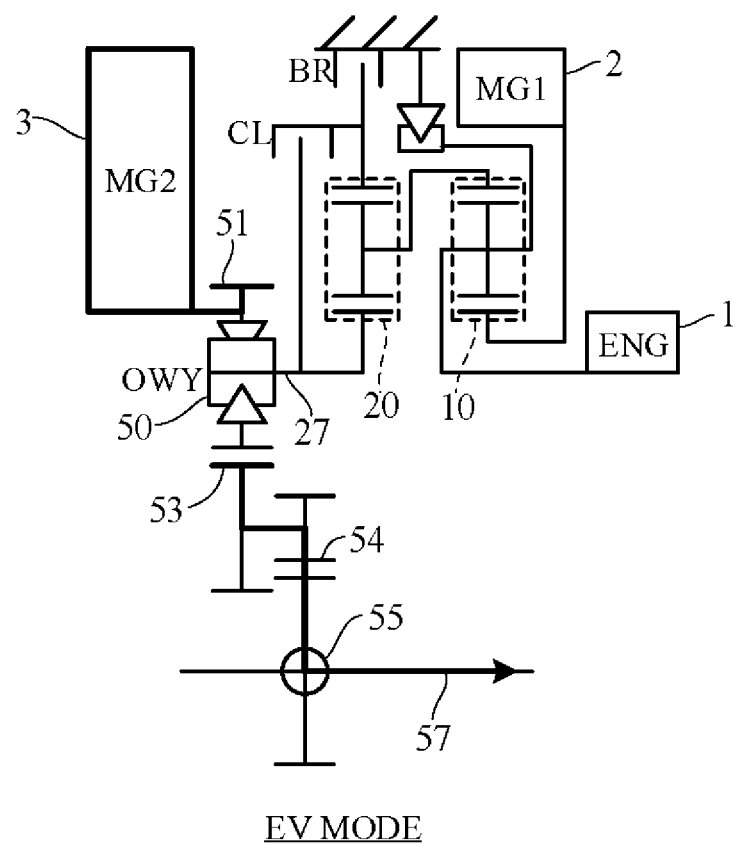
FIG. 4 is a skeleton diagram showing a flow of torque transmission in EV mode in the drive system of FIG. 1.

In EV mode, the vehicle is driven for traveling solely by motive power of the second motor-generator 3. As shown in FIG. 3, in EV mode, the brake mechanism 30 and clutch mechanism 40 are both OFF, and the engine 1 is stopped, in accordance with instructions from the controller 4. FIG. 4 is a skeleton diagram showing flow of torque transmission in EV mode.

As show in FIG. 4, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 5:
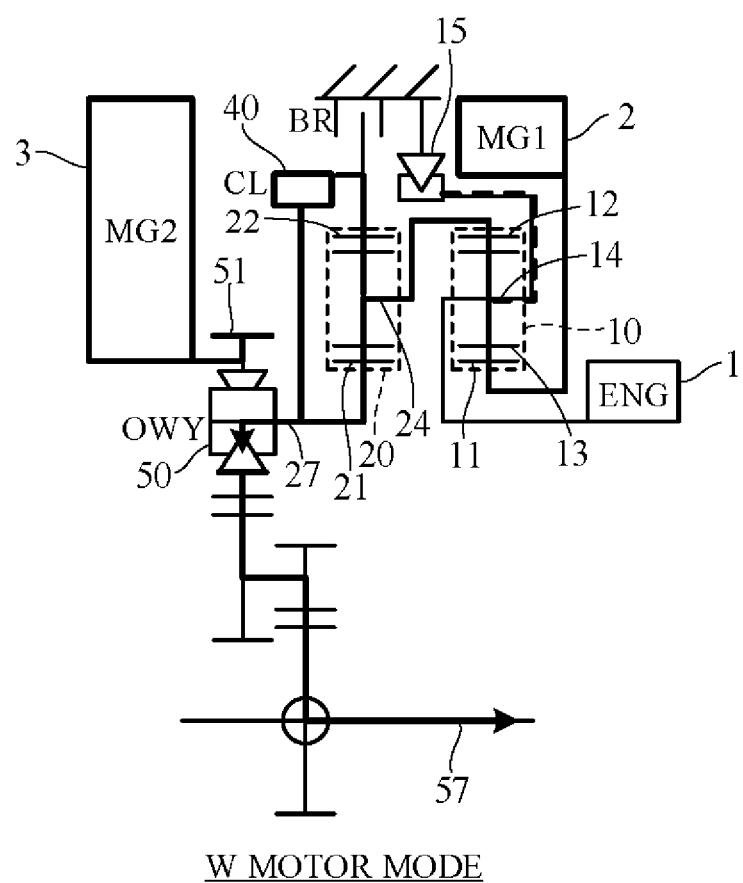
FIG. 5 is a skeleton diagram showing a flow of torque transmission in W motor mode in the drive system of FIG. 1.

In W motor mode, the vehicle is driven for traveling by motive power of the first motor-generator 2 and the second motor-generator 3. As shown in FIG. 3, in W motor mode, the brake mechanism 30 is OFF, the clutch mechanism 40 is ON and the engine 1 is stopped, in accordance with instructions from the controller 4. FIG. 5 is a skeleton diagram showing flow of torque transmission in W motor mode.

As show in FIG. 5, in W motor mode, rotation of the first carrier 14 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode, travel driving force can be increased to greater than in EV mode.

Figure 6:
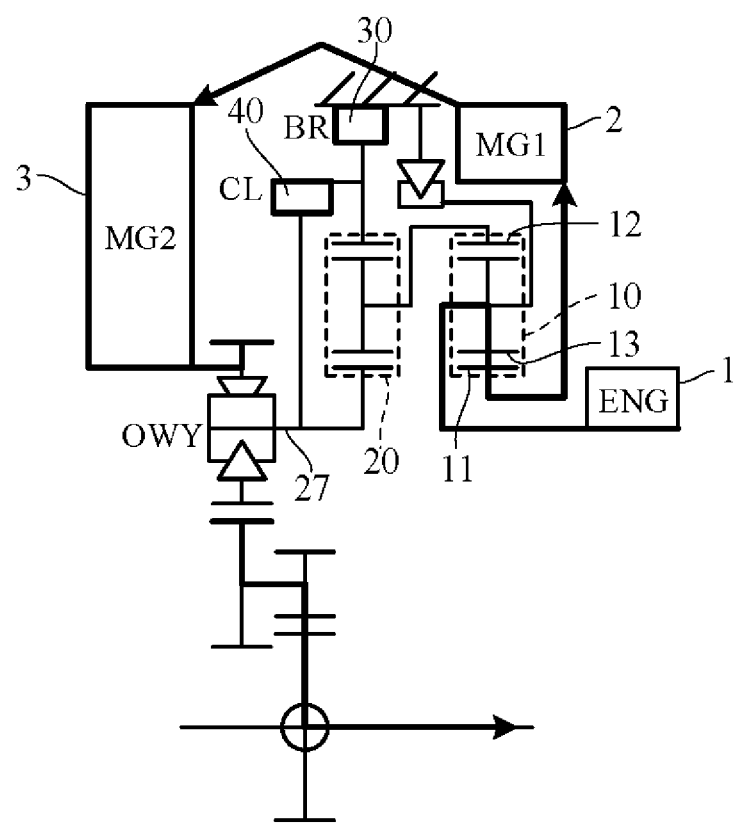
FIG. 6 is a skeleton diagram showing a flow of torque transmission in series mode in the drive system of FIG. 1.

In series mode, the vehicle is driven for traveling by motive power of the second motor-generator 3 while the first motor-generator 2 is being driven by motive power from the engine 1 to generate electric power. As shown in FIG. 3, in series mode, the brake mechanism 30 and clutch mechanism 40 are both ON and the engine 1 is operated, in accordance with instructions from the controller 4. FIG. 6 is a skeleton diagram showing flow of torque transmission in series mode.

As shown in FIG. 6, in series mode, rotation from the first ring gear 12 to as far as the output shaft 27 is stopped, so that all power output from the engine 1 is input through the first pinions 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50. Amount of power supplied to the second motor-generator 3 through the electrical path is not greater than allowable output of the power control unit 5.

In HV mode, the vehicle is driven for traveling by motive power produced by the engine 1 and the second motor-generator 3. Within the HV mode, the HV low mode corresponds to a mode of wide-open acceleration from low speed, and the HV high mode corresponds to a mode of normal traveling after EV traveling. As shown in FIG. 3, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 7:
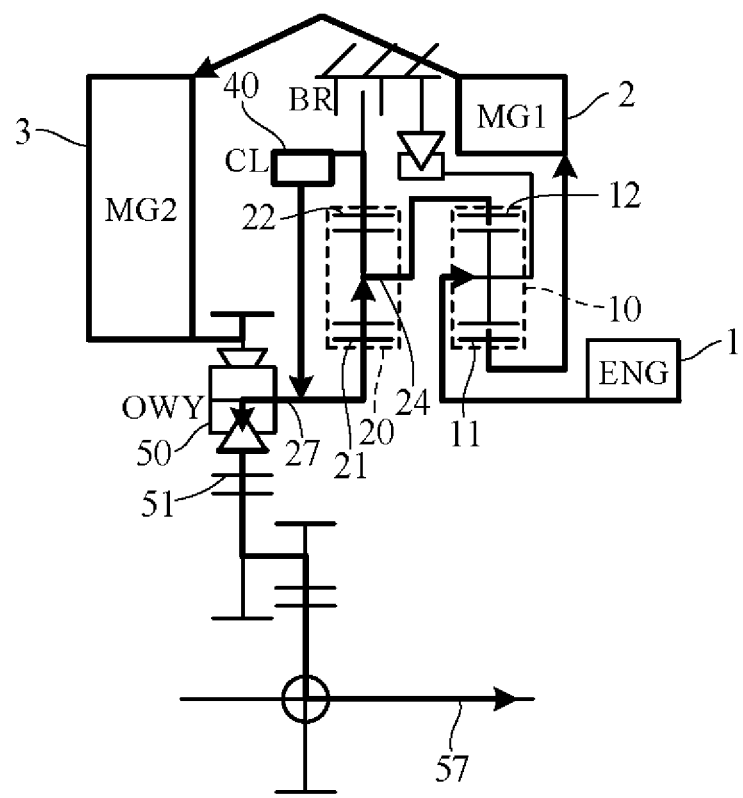
FIG. 7 is a skeleton diagram showing a flow of torque transmission in HV low mode in the drive system of FIG. 1.

FIG. 7 is a skeleton diagram showing flow of torque transmission in HV low mode. As shown in FIG. 7, in HV low mode, some torque output from the engine 1 is transmitted through the first sun gear 11 to the first motor-generator 2. As a result, the battery 6 is charged by power generated by the first motor-generator 2, and, in addition, electrical drive power is supplied from the battery 6 to the second motor-generator 3.

In HV low mode, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

Figure 8:
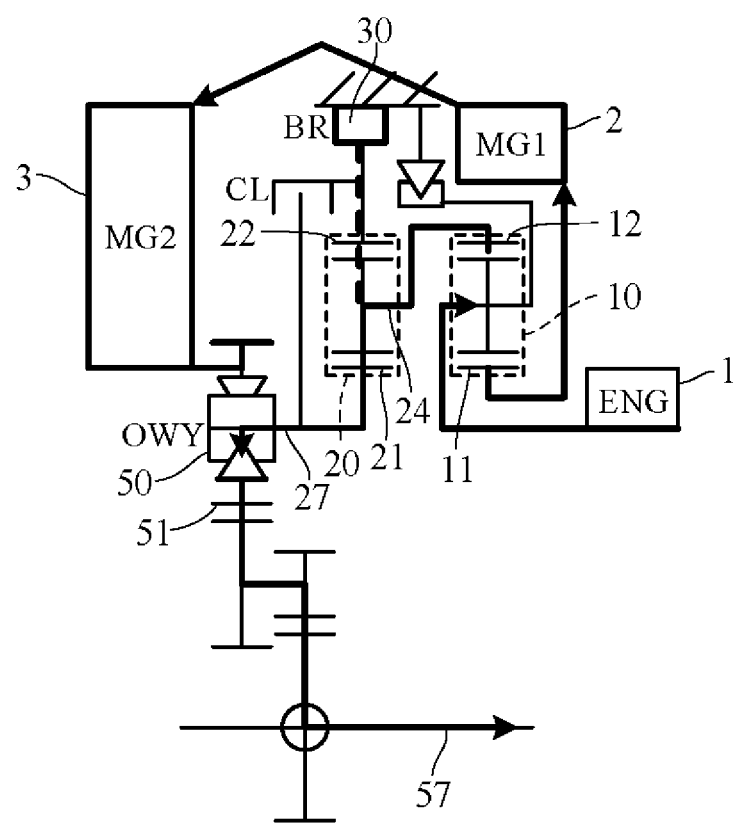
FIG. 8 is a skeleton diagram showing a flow of torque transmission in HV high mode in the drive system of FIG. 1.

FIG. 8 is a skeleton diagram showing flow of torque transmission in HV high mode. As shown in FIG. 8, in HV high mode, similarly to in HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized.

A point of interest here is that in EV mode the output gear 51 is allowed to rotate relative to the output shaft 27 by action of the one-way clutch 50 and the one-way clutch 50 is in unlocked state, while in HV mode the output shaft 27 rotates integrally with the output gear 51 and the one-way clutch 50 is in locked state. So once the vehicle is running in EV mode, if the engine 1 thereafter starts and EV mode transitions to HV mode (e.g., HV low mode), the one-way clutch 50 is apt to experience an impact at the time of being engaged. An explanation of this point follows.

FIGS. 9A to 9D are diagrams each showing an example of an alignment chart in a given drive mode. In the drawings, the first sun gear 11, first carrier 14 and first ring gear 12 are designated 1S, 1C and 1R, respectively, and the second sun gear 21, second carrier 24 and second ring gear 22 are designated 2S, 2C and 2R, respectively. Rotation direction of the first ring gear 12 and second carrier 24 during forward vehicle movement is defined as positive direction. Forward direction is indicated by symbol "+" and torque acting in forward direction is indicated by upward pointing arrow.

Figure 9A:
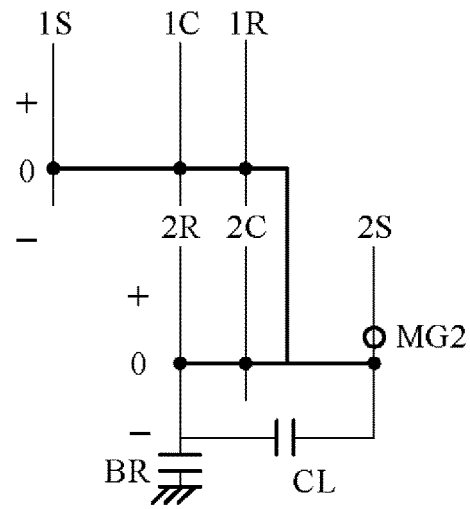
FIG. 9A is an alignment chart showing an example of operation in EV mode.

In EV mode, for example, the vehicle starts traveling in response to driver depression of the accelerator pedal. FIG. 9A is an alignment chart in EV mode. As shown in FIG. 9A, in EV mode, action of the one-way clutch 50 keeps rotation of the second sun gear 21 (2S) of the second planetary gear mechanism 20 stopped, and only the second motor-generator 3 (MG2) is driven to rotate in positive direction so that the vehicle traveling is started by driving torque from the second motor-generator 3.

Figure 9B:
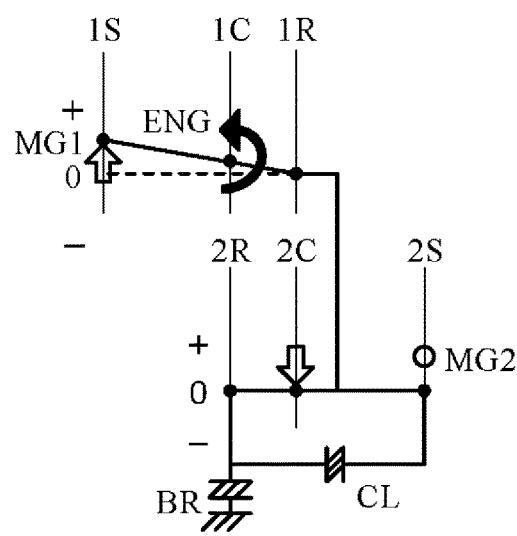
FIG. 9B is an alignment chart showing an example of operation in start mode.

After the vehicle starts off in EV mode, drive mode switches to HV mode (e.g., HV low mode) along with increase of vehicle speed. This leads first to the engine 1 being started. FIG. 9B is an alignment chart showing engine 1 starting (called "start mode"). In start mode, as shown in FIG. 9B, while the second motor-generator 3 (MG2) is being kept rotationally driven in positive direction, the brake mechanism 30 (BR) and clutch mechanism 40 (CL) are both turned ON, and rotation of the second carrier 24 (2C) and first ring gear 12 (1R) is stopped. In this state, the first motor-generator 2 (MG1) is rotationally driven in positive direction to rotate the output shaft 1a of the engine 1 through the first carrier 14 (1C) and thereby start the engine 1. Optionally, the order of the procedures of turning ON the brake mechanism 30 (BR) and clutch mechanism 40 (CL) and of rotationally driving the first motor-generator 2 (MG1) in positive direction can be reversed.

Figure 9C:
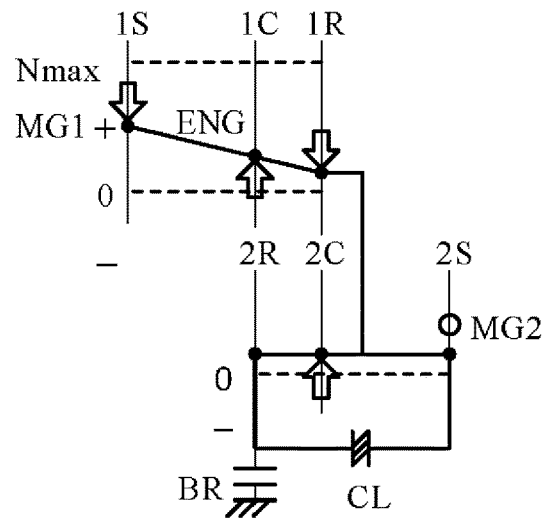
FIG. 9C is an alignment chart showing an example of operation in the course of switching to HV low mode after engine starting.
Figure 9D:
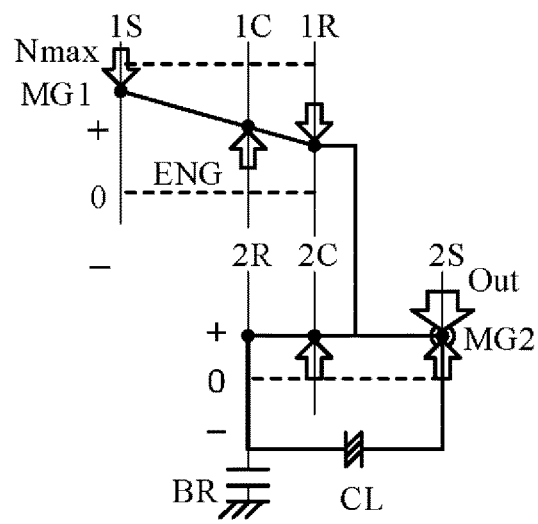
FIG. 9D is an alignment chart showing an example of operation after switching to HV low mode.

After the engine starts, drive mode is switched to HV low mode. FIG. 9C is an alignment chart showing drive mode in the course of switching to HV low mode after engine starting. FIG. 9D is an alignment chart of state following switch to HV low mode. As shown in FIG. 9C, when drive mode is being switched to HV low mode, engine starting is followed by turning OFF the brake mechanism 30 (BR) and turning ON the clutch mechanism 40 (CL). Since this causes reaction force to act on the first ring gear 12 (1R), the first ring gear 12 (1R) is rotated in positive direction by the engine 1 and the first motor-generator 2 (MG1) starts to generate electricity.

The second carrier 24 (2C) rotates in positive direction at this time. Since the second carrier 24 (2C), second sun gear 21 (2S) and second ring gear 22 (2R) are integrally configured, the second sun gear 21 (2S) rotates at same speed as the second carrier 24 (2C). After engine starting, rotational speed of the second sun gear 21 (2S) gradually increases toward rotational speed of the second motor-generator 3 (MG2).

As shown in FIG. 9D, once increase of engine speed causes rotational speed of the second sun gear 21 (2S) to reach rotational speed of the second motor-generator 3 (MG2), torque of the second sun gear 21 (2S) is added to torque of the second motor-generator 3, thereby enabling the vehicle to travel with greater driving force than when traveling in EV mode. After drive mode switches to HV low mode, rotational speed of the first motor-generator 2 is controlled to a target rotational speed which is less than or equal to a maximum allowable rotational speed (upper limit rotational speed Nmax) of the first motor-generator 2.

In the course of switching from start mode to HV low mode in this manner, an impact acts on the one-way clutch 50 at the instant rotational speed of the second sun gear 21 (2S) (rotational speed of the output shaft 27) reaches rotational speed of the second motor-generator 3 (MG2). Adequate durability of the one-way clutch 50 may therefore be impossible to ensure. Although one option is to enhance durability of the one-way clutch 50 by adopting a larger and sturdier structure, this would increase size and weight of the drive system (drive unit) 100. Another risk of this approach is that shock arising when the impact acts on the one-way clutch 50 is apt to prevent realization of a smooth acceleration feel. On the other hand, an attempt to mitigate impact acting on the one-way clutch 50 by slowly switching drive mode would degrade responsiveness during drive mode switching. The present embodiment therefore achieves mitigation of impact acting on the one-way clutch 50 without adversely affecting responsiveness during drive mode switching by configuring the drive system 100 as set out in the following.

Figure 10:
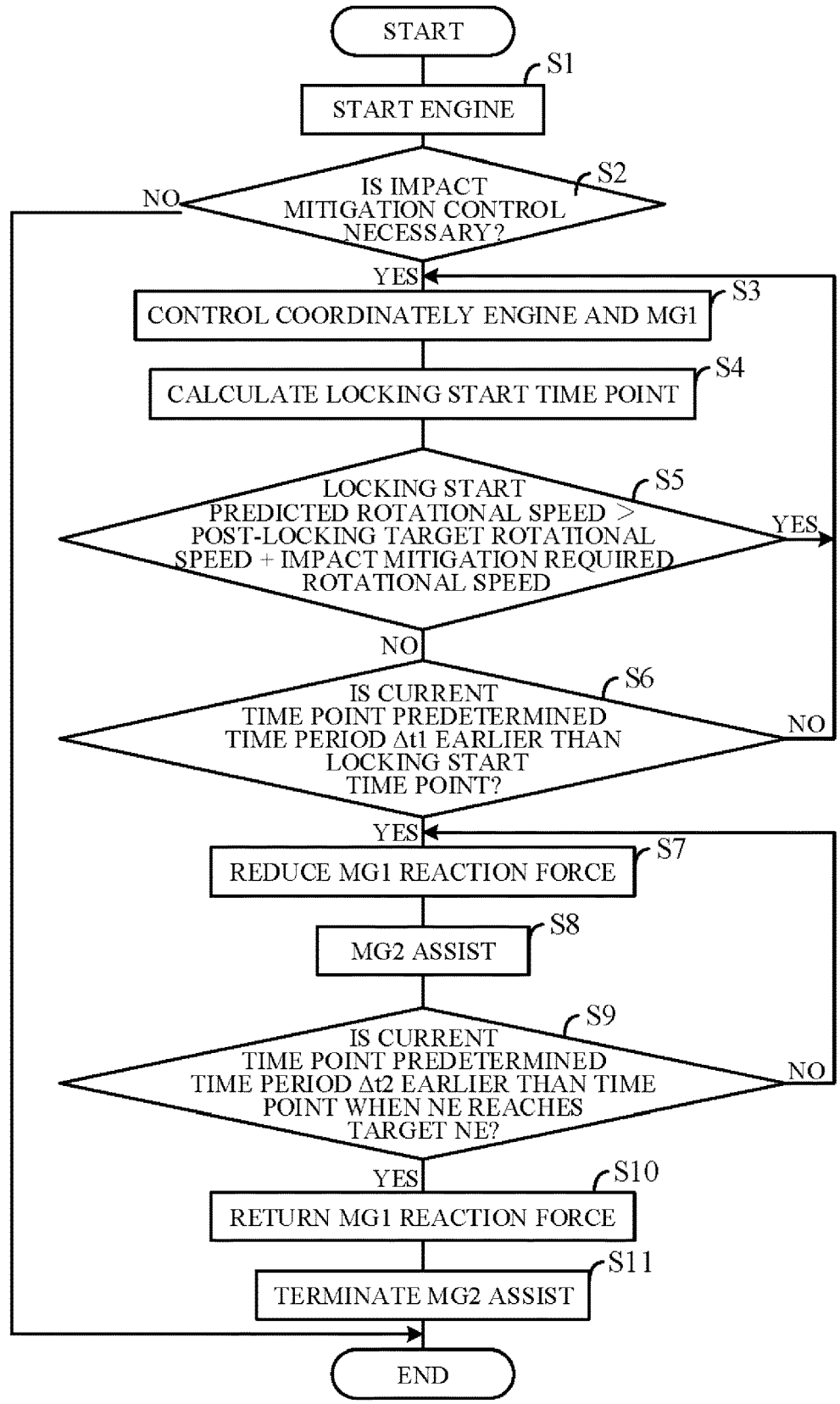
FIG. 10 is a flowchart showing an example of a processing performed by a controller of FIG. 1.

FIG. 10 is a flowchart showing an example of processing performed by the CPU of the controller 4 (primarily processing performed by the engine control ECU 4a and the motor-generator ECU 4c) in accordance with a program stored in memory in advance, particularly an example of processing for mitigating impact acting on the one-way clutch 50. The processing shown in the flowchart of FIG. 10 is started during traveling in EV mode, for example, when whether switching to HV mode (HV low mode) is necessary is determined based on signals from the vehicle speed sensor 36 and the accelerator opening angle sensor 37, and the result of the determination is that switching to HV low mode is necessary.

First, in S1 (S: processing Step), the engine 1 is started. This is done by outputting a control signal to the hydraulic pressure control unit 8 to turn ON both the brake mechanism 30 and the clutch mechanism 40 and outputting a control signal to the power control unit 5 to drive the first motor-generator 2 and start the engine 1 by rotating its crankshaft. Once engine speed reaches full-firing speed and starting of the engine 1 is completed, a control signal is output to the hydraulic pressure control unit 8 to turn the brake mechanism 30 OFF.

Next, in S2, whether impact mitigation control for mitigating impact acting on the one-way clutch 50 is necessary is determined. This determination is performed by, for example, storing in memory in advance a map representing an impact mitigation required region defined by vehicle speed and accelerator opening angle and determining whether operating point on the map corresponding to signals from the vehicle speed sensor 36 and the accelerator opening angle sensor 37 is within the impact mitigation required region. The reasoning here is that cases in which need to mitigate impact acting on the one-way clutch 50 is high are ones in which impact is expected to be a certain size or greater, so that the determination in S2 is equivalent to determining whether impact is expected to be greater than or equal to a predetermined value. If a positive decision is made in S2, the routine proceeds to S3, and if a negative decision is made, the routine is terminated.

In S3, the engine 1 and first motor-generator 2 are coordinately controlled toward a target operation point in HV low mode. In other words, in HV low mode, rotational speed of the engine 1 (engine speed), torque of the engine 1 (ENG torque), rotational speed of the first motor-generator 2 (MG1 speed), and torque of the first motor-generator 2 (MG1 torque) are each controlled to a target operation point dependent on predetermined characteristics (target rotational speed or target torque). Accordingly, in S3, the engine 1 and the first motor-generator 2 are controlled so that ENG torque and MG1 torque migrate toward these target operation points after engine starting.

Figure 11:
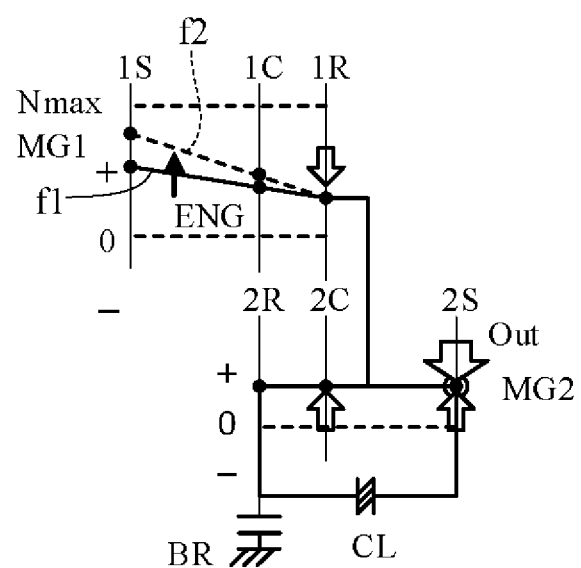
FIG. 11 is an alignment chart showing an example of operation at instant impact acts on a one-way clutch.

Additionally in S3, the engine 1 and first motor-generator 2 are controlled so that MG1 speed and engine speed becomes to speeds lower by predetermined rotational speeds than the target rotational speeds in HV mode, before occurrence of impact in the one-way clutch 50 (characteristic curve f1 of FIG. 11). The predetermined rotational speed set with respect to the first motor-generator 2 here is defined, for example, as a value whereat MG1 speed does not exceed upper limit rotational speed Nmax when MG1 speed increases upon MG1 torque reaction being relieved at occurrence of impact in the one-way clutch 50 (S7 discussed later). The predetermined rotational speed set with respect to the engine 1 is defined, for example, as a value equivalent to increase of engine speed when MG1 speed increases upon MG1 torque reaction being relieved at occurrence of impact in the one-way clutch 50.

Next, in S4, time point at which rotational speed of the second sun gear 21 is to reach rotational speed of the second motor-generator 3 (MG 2 speed) is calculated, i.e., time point at which the one-way clutch 50 is expected to assume locked state (locking start time point) is calculated. Locking start time point is, for example, calculated from values such as rotational speed of the second sun gear 21 and change rate thereof detected by the rotational speed sensor 35, and MG 2 speed and change rate thereof detected by the rotational speed sensor 34. Alternatively, locking start time point can be calculated from engine speed and MG1 speed, or the like.

Next, in S5, size relationship is determined between, on the one hand, predicted rotational speeds of the engine 1 and first motor-generator 2 at time the one-way clutch 50 assumes locked state (namely, locking start predicted rotational speeds) and, on the other, sum of target rotational speeds of the engine 1 and first motor-generator 2 after locked state assumed (namely, post-locking target rotational speeds) and rotational speeds of the engine 1 and first motor-generator 2 required for impact mitigation (namely, impact mitigation required rotational speeds). In other words, whether locking start predicted rotational speeds are greater than sum of post-locking target rotational speeds and impact mitigation required rotational speeds is determined.

Impact mitigation required rotational speeds as termed here are amounts of increase in engine speed and MG1 speed necessary for mitigating impact acting on the one-way clutch 50. Thus, in the configuration of the present embodiment, impact acting on the one-way clutch 50 is absorbed as inertia of the first motor-generator 2, the energy thereof increases MG1 speed, and engine speed is increased in accordance with increase of MG1 speed (S7 discussed later), with the increases of MG1 speed and engine speed at this time being equivalent to the impact mitigation required rotational speeds.

The impact mitigation required rotational speeds are calculated from, inter alia, kinetic energy of rotors of the first power transmission path 71, i.e., of rotors on upstream side from the one-way clutch 50 (the second sun gear 21 etc.), and ENG torque, and the impact mitigation required rotational speeds increase with increasing magnitude of rotor kinetic energy and increasing magnitude of ENG torque. If a negative decision is made in S5, the routine proceeds to S6. If a positive decision is made in S5, the routine returns to S3 in order to start again the coordinate control of S3 and enable impact mitigation control.

In S6, whether current time point is predetermined time period Δt1 earlier than locking start time point calculated in S4 is determined. Predetermined time period Δt1 is set to, for example, 1 sec or shorter, particularly within a range of several μs to several tens of μs, i.e., to a value immediately preceding the locking start time point. Predetermined time period Δt1 is, for example, preferably set to time period required for MG1 torque to fall to 0. Optionally, this predetermined time period Δt1 can, for example, be decided empirically in advance. If a positive decision is made in S6, the routine proceeds to S7, and if a negative decision is made, the routine returns to S3.

In S7, a control signal is output to the power control unit 5 to reduce reaction force acting on the first motor-generator 2, e.g., to reduce the reaction force to 0. FIG. 11 is a diagram showing an example of an alignment chart at this time point. Namely, FIG. 11 is an alignment chart of state at time point between FIG. 9C and FIG. 9D, namely, at instant impact acts on the one-way clutch 50.

Reducing reaction force acting on the first motor-generator 2 at the time an impact acts on the one-way clutch 50 owing to rotational speed of the second sun gear 21 reaching MG 2 speed causes impact force to be received by the first motor-generator 2. Therefore, MG1 speed increases in a range not exceeding upper limit rotational speed Nmax, as indicated by a dotted line (characteristic curve f2) in FIG. 1. Since impact energy is therefore converted to rotational energy of the first motor-generator 2, impact acting on the one-way clutch 50 is absorbed. As seen in FIG. 11, engine speed also increases simultaneously at this time.

Next, in S8, a control signal is output to the power control unit 5 to increase torque of the second motor-generator 3

(MG2 torque) by a predetermined value (MG2 assist). This measure is taken because relieving reaction force of the first motor-generator 2 also relieves reaction force of the first ring gear 12, which in turn decreases driving torque transmitted to the axles 57 from the engine 1. This decrease is therefore covered in S8 by using power from the battery 6 to increase MG2 torque. In a case where driving torque required by the vehicle can be obtained without increasing MG2 torque, the processing of S8 can be skipped.

Next, in S9, time point when engine speed reaches target speed (target Ne) is predicted based on a signal from the engine speed sensor 38, and whether current time point is predetermined time period $\Delta t2$ earlier than the predicted time point is determined. Predetermined time period $\Delta t2$ can be set to, for example, an appropriate value derived empirically in advance. Alternatively, time elapse determination can be replaced by determination of whether engine speed reaches or exceeds a predetermined value. If a positive decision is made in S9, the routine proceeds to S10, and if a negative decision is made, the routine returns to S7.

In S10, a control signal is output to the power control unit 5 to return force of the first motor-generator 2 to original value, i.e., to value before reduction in S7. Since this changes MG1 torque from 0 to target torque, power generation by the first motor-generator 2 increases.

Next, in S11, a control signal is output to the power control unit 5 to terminate the MG2 assist of S8. This restores MG2 torque to target torque. Switching from EV mode to HV mode is completed upon completion of the aforesaid processing.

Main operations of the drive system 100 according to the present embodiment are concretely explained in the following. FIG. 12 is a time chart of switching from EV mode to HV mode showing examples of time-course changes in clutch torque of the brake mechanism 30 (preceding stage torque), clutch torque of the clutch mechanism 40 (succeeding stage torque), engine speed (Ne), ENG torque, MG1 speed, MG1 torque, and MG2 torque.

As shown in FIG. 12, at initial time t1, MG2 torque is equal to target torque TMG2$a$ (>0) and the vehicle travels in EV mode. Since the brake mechanism 30 and clutch mechanism 40 are both OFF at this time, preceding stage torque and succeeding stage torque are both 0 at this time. Moreover, since the engine 1 is stopped, Ne and ENG torque are both 0, and MG1 speed and MG1 torque are both 0.

When the driver increases depression of the accelerator pedal at time t2, switching to HV low mode is instructed. In response to this instruction, first, in order to start the engine 1, preceding stage torque and succeeding stage torque are both increased by turning ON both the brake mechanism 30 and the clutch mechanism 40. In addition, the first motor-generator 2 functions as a motor (MG1 torque >0), MG1 speed increases, the crankshaft of the engine 1 is driven, and Ne increases (S1).

When Ne increases to full-firing speed and engine starting is determined at time t3, the brake mechanism 30 is turned OFF and preceding stage torque decreases. At this time, ENG torque increases toward target torque Tea, and Ne gradually increases. Further, MG1 torque (reaction force of the first motor-generator 2) rises from 0 toward target torque TMG1$a$, electric power generation by the first motor-generator 2 commences, and MG1 speed gradually increases. At this time, MG1 speed is limited to a value lower than target rotational speed NMG1$a$ by a predetermined rotational speed. Similarly, Ne is limited to a value lower than target rotational speed Nea by a predetermined rotational speed (S3).

When rotational speed of the second sun gear 21 approaches MG 2 speed and a time point earlier than (immediately preceding) locking start time point of the one-way clutch 50 by predetermined time period $\Delta t1$ is reached at time t4, reaction force acting on the first motor-generator 2 is relieved and MG1 torque (reaction force of the first motor-generator 2) decreases (S7). MG2 torque increases at this time (S8). Driving force required by the vehicle can therefore be obtained despite decrease of MG1 torque.

When one-way clutch 50 assumes locked state at time t5, impact that acted on the one-way clutch 50 in a conventional configuration is instead received by the first motor-generator 2, whereby MG1 speed increases and Ne increases (FIG. 11). Owing to the increase of MG1 speed and Ne, impact that would otherwise act on the one-way clutch 50 can be absorbed.

At time t6, predetermined time period $\Delta t2$ earlier than when Ne reaches target rotational speed Nea at time t7, MG1 torque (reaction force of first motor-generator 2) increases toward target torque TMG1$a$ (S10). At this time, MG2 torque decreases toward target torque TMG2$a$ (S11). After time t7, at time t8, for example, Ne becomes target rotational speed Nea, ENG torque becomes target torque Tea, MG1 speed becomes target rotational speed NMG1$a$, MG1 torque becomes target torque TMG1$a$, and MG2 torque becomes target torque TMG2$a$. This completes switching to HV low mode.

The present embodiment can achieve advantages and effects such as the following:

(1) The hybrid vehicle drive system 100 according to the present embodiment includes: the engine 1; the first motor-generator 2; the first planetary gear mechanism 10 connected to the engine 1 for dividing and outputting motive power generated by the engine 1 between the first motor-generator 2 and the first power transmission path 71; the second motor-generator 3 connected to the second power transmission path 72 between the first power transmission path 71 and the axles 57: the one-way clutch 50 interposed between the output shaft 27 of the first power transmission path 71 and the output gear 51 constituting input shaft of the second power transmission path 72 and configured so that when in locked state the output shaft 27 and the output gear 51 rotate integrally and that when in unlocked state the output gear 51 relatively rotates in relation to the output shaft 27; the speed change mechanism 70 provided in the first power transmission path 71 for switching vehicle drive mode from EV mode wherein the vehicle is driven by motive power of the second motor-generator 3 with the engine 1 stopped, through start mode for starting the engine 1, to HV mode wherein the vehicle is driven by motive power of the engine 1 and motive power of the second motor-generator 3; and the controller 4 for controlling the engine 1, the first motor-generator 2, the second motor-generator 3, and the speed change mechanism 70 (FIG. 1). When drive mode is switched from start mode to HV mode by action of the speed change mechanism 70, the controller 4 controls the first motor-generator 2 to reduce reaction force acting on the first motor-generator 2 at time when state of one-way clutch 50 changes from unlocked state to locked state (FIG. 10).

Owing to this configuration, impact on the one-way clutch 50 acts to increase rotational speed of the first motor-generator 2, whereby impact acting on the one-way clutch 50 is absorbed and durability of the one-way clutch 50 enhanced. Since this obviates need to increase durability of the one-way clutch 50 such as by enlarging the one-way clutch 50, the drive system 100 can be compactly configured and cost increase of the drive system 100 minimized. Since shock arising when impact acts on the one-way clutch 50 is alleviated, a smooth acceleration feel can be realized. Moreover, since impact is absorbed by controlling torque of the first motor-generator 2 (MG1 torque), high-precision control can be implemented that is less likely to cause problems, like, for example, delayed response and driving force variance, than, for example, a configuration that responds to impact occurrence by instantaneously reducing engine torque or by slipping the low speed ratio clutch mechanism 40.

(2) In addition, at the instant of the one-way clutch 50 changing from unlocked state to locked state, the controller 4 controls the second motor-generator 3 so as to increase torque of the second motor-generator 3 (MG 2 torque). Since this minimizes decrease in travel driving force owing to reaction force of the first motor-generator 2 having been relieved, good vehicle running performance can be achieved while also absorbing impact acting on the one-way clutch 50.

(3) In advance of instant when the one-way clutch 50 changes from unlocked state to locked state after starting of the engine 1, the controller 4 limits rotational speed of the first motor-generator 2 to a value lower than target rotational speed NMG1a of the first motor-generator 2 in HV low mode. This prevents rotational speed of the first motor-generator 2 from exceeding upper limit rotational speed Nmax when rotational speed of the first motor-generator 2 increases owing to impact acting on the one-way clutch 50.

(4) Furthermore, in advance of instant when the one-way clutch 50 changes from unlocked state to locked state after starting of the engine 1, the controller 4 limits rotational speed of the engine 1 to a value lower than target rotational speed Nea of the engine 1 in HV low mode. This prevents engine speed from increasing to higher than a predetermined rotational speed (e.g., target rotational speed Nea), notwithstanding that engine speed also increases along with increase of rotational speed of the first motor-generator 2 when impact acts on the one-way clutch 50.

(5) The speed change mechanism 70 includes: the second planetary gear mechanism 20 having the second sun gear 21 connected to the output shaft 27, the second carrier 24 connected to the first planetary gear mechanism 10, and the second ring gear 22; the brake mechanism 30 for braking or not braking rotation of the second ring gear 22; and the clutch mechanism 40 for integrally joining or separating the second sun gear 21 and the second ring gear 22. The controller 4 controls the speed change mechanism 70 to disengage the brake mechanism 30 and disengage the clutch mechanism 40 when implementing EV mode, to engage the brake mechanism 30 and engage the clutch mechanism 40 when implementing start mode, and to engage either the brake mechanism 30 or the clutch mechanism 40 and disengage the other thereof when implementing HV mode. This enables typical drive modes of a hybrid vehicle, namely, EV mode and HV mode, to be readily implemented with a simple configuration solely for controlling engaging actions of the brake mechanism 30 and the clutch mechanism 40. Further, owing to provision of the one-way clutch 50 upstream of the second motor-generator 3 in the torque transmission path, negative acceleration caused by pull back of torque arising when the brake mechanism 30 and the clutch mechanism 40 are simultaneously engaged in start mode can be prevented from occurring to thereby ensure smooth switching of drive modes.

Various modifications of the aforesaid embodiment are possible. Some examples are explained in the following. In the aforesaid embodiment (FIG. 1), the speed change mechanism 70 is configured as an automatic speed change mechanism adapted to automatically shift speed stage in accordance with vehicle speed and required driving force. In other words, shift instructions are output by the controller 4, but manual output of shift instructions by driver operation of a switch, for example, is also alternatively possible. The speed change mechanism 70 need not have one each of a brake mechanism and a clutch mechanism, but can instead have a pair of brake mechanisms or a pair of clutch mechanisms. In the aforesaid embodiment (FIG. 1), the speed change mechanism 70 includes the second planetary gear mechanism 20, brake mechanism 30 and clutch mechanism 40 and is adapted to shift from EV mode to start mode and HV mode, but a mode change mechanism is not limited to this configuration.

In the aforesaid embodiment (FIG. 1), the MG1 speed and Ne are reduced in lead-up to impact acting on the one-way clutch 50, and MG1 torque reaction force is controlled to 0. However, the controller 4 serving as an electronic control unit having a microprocessor and memory is not limited to the aforesaid configuration insofar as at least being adapted to reduce reaction force acting on the first motor-generator at time when the one-way clutch 50 changes from unlocked state to locked state. For example, MG1 torque reaction force need not be controlled to as far as 0. Alternatively, shock acting on the axles 57 can be reduced by reducing MG 2 torque to a predetermined value at instant impact acts on the one-way clutch 50.

In the aforesaid embodiment (FIG. 1), the first planetary gear mechanism 10 is adapted to divide motive power generated by the engine 1 to the first motor-generator 2 and the first power transmission path 71. However, a power division mechanism is not limited to the aforesaid configuration. In the aforesaid embodiment (FIG. 1), the speed change mechanism 70 is provided in the first power transmission path 71. However, the speed change mechanism can be omitted, and a first power transmission path is not limited to the aforesaid configuration. In the aforesaid embodiment (FIG. 1), multi-plate wet type engagement elements are used in the brake mechanism 30 and clutch mechanism 40, but band brake, dog or other type of engagement elements can be used instead.

In the aforesaid embodiment (FIG. 1), torque is transmitted from the second motor-generator 3, and the second power transmission path 72 is formed for transmitting to the axles 57 motive power input to the output gear 51 through the one-way clutch 50 by means of, inter alia, the output gear 51, large-diameter gear 53 and the small-diameter gear 54. However, a second power transmission path is not limited to the aforesaid configuration. As far as interposed between an output shaft of the first power transmission path (output shaft 27) and an input shaft of the second power transmission path (output gear 51) and configured so that the output shaft and input shaft rotate integrally in a locked state and that the input shaft relatively rotates in relation to the output shaft in an unlocked state, a one-way clutch is not limited to the aforesaid configuration.

In the aforesaid embodiment, the controller 4 is adapted to control actions of the brake mechanism 30 and clutch mechanism 40 so as to implement EV mode, W motor mode, series mode, HV low mode, HV high mode and the like, but can also be adapted to implement other modes.

The above embodiment can be combined as desired with one or more of the above modifications. The modifications can also be combined with one another.

According to the present invention, it is possible to enhance durability of a one-way clutch under a condition where an impact acts on the one-way clutch when changing drive mode.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
an internal combustion engine;
a first motor-generator;
a power transmission path including a first power transmission path and a second power transmission path connected with each other in series;
a power division mechanism connected to the internal combustion engine to divide a power generated by the internal combustion engine to the first motor-generator and the first power transmission path;
a second motor-generator connected to the second power transmission path;
a one-way clutch interposed between an output shaft in the first power transmission path and an input shaft in the second power transmission path so that the output shaft and the input shaft integrally rotate in a locked state and the output shaft relatively rotates in relation to the input shaft in an unlocked state;
a mode change mechanism provided in the first power transmission path to change a drive mode from an EV mode in which the hybrid vehicle is driven by a power of the second motor-generator with the internal combustion engine stopped to a HV mode in which the hybrid vehicle is driven by the power of the second motor-generator and the power generated by the internal combustion engine through a start mode in which the internal combustion engine is started; and
an electronic control unit including a microprocessor and a memory and configured to perform controlling the internal combustion engine, the first motor-generator, the second motor-generator and the mode change mechanism, wherein
the microprocessor is configured to perform
the controlling including controlling the first motor-generator so as to reduce a reaction force acting on the first motor-generator, at a time at which a state of the one-way clutch changes from the unlocked state to the locked state, when the drive mode is changed from the start mode to the HV mode by the mode change mechanism.

2. The drive system according to claim 1, wherein
the microprocessor is configured to perform
the controlling including controlling the second motor-generator so as to increase a drive torque of the second motor-generator, at the time at which the state of the one-way clutch changes from the unlocked state to the locked state.

3. The drive system according to claim 1, wherein
the microprocessor is configured to perform
the controlling including controlling the first motor-generator so that a rotational speed of the first motor-generator is lower than a target rotational speed of the first motor-generator in the HV mode, before the state of the one-way clutch changes from the unlocked state to the locked state after starting of the internal combustion engine.

4. The drive system according to claim 3, wherein
the microprocessor is configured to perform
the controlling including controlling the internal combustion engine so that a rotational speed of the internal combustion engine is lower than a target rotational speed of the internal combustion engine in the HV mode, before the state of the one-way clutch changes from the unlocked state to the locked state after starting of the internal combustion engine.

5. The drive system according to claim 1, wherein
the mode change mechanism includes:
a planetary gear mechanism having a sun gear connected to the output shaft, a carrier connected to the power division mechanism, and a ring gear;
a brake mechanism configured to brake or non-brake the ring gear by engaging or disengaging; and
a clutch mechanism configured to integrally join or separate the sun gear and the ring gear by engaging or disengaging, and
the microprocessor is configured to perform
the controlling including controlling the mode change mechanism so as to disengage the brake mechanism and engage the clutch mechanism when the drive mode is switched to the EV mode, engage the brake mechanism and engage the clutch mechanism when the drive mode is switched to the start mode, and disengage one of the brake mechanism and the clutch mechanism and engage the other of the brake mechanism and the clutch mechanism when the drive mode is switched to the HV mode.

6. The drive system according to claim 1, wherein
the microprocessor is configured to perform
the controlling including controlling the first motor-generator so as to calculate a locking start time at which it is estimated that the state of the one-way clutch changes from the unlocked state to the locked state and start to reduce the reaction force acting on the first motor-generator at a time earlier than the locking start time by a predetermined time period.

7. The drive system according to claim 6, wherein
the microprocessor is configured to perform
the controlling including controlling the first motor-generator so as to reduce the reaction force acting on the first motor-generator to 0, at the time at which the state of the one-way clutch changes from the unlocked state to the locked state, when the drive mode is changed from the start mode to the HV mode by the mode change mechanism.

8. A drive method of a hybrid vehicle, the hybrid vehicle including: an internal combustion engine; a first motor-generator; a power transmission path including a first power transmission path and a second power transmission path connected with each other in series; a power division mechanism connected to the internal combustion engine to divide a power generated by the internal combustion engine to the first motor-generator and the first power transmission path; a second motor-generator connected to the second power transmission path; a one-way clutch interposed between an output shaft in the first power transmission path and an input shaft in the second power transmission path so that the output shaft and the input shaft integrally rotate in a locked state and the output shaft relatively rotates in relation to the input shaft in an unlocked state; and a mode change mechanism provided in the first power transmission path to change a drive mode from an EV mode in which the hybrid vehicle is driven by a power of the second motor-generator with the internal combustion engine stopped to a HV mode in which the hybrid vehicle is driven by the power of the second motor-generator and the power generated by the internal combustion engine through a start mode in which the internal combustion engine is started, the drive method comprising controlling the internal combustion engine, the first motor-generator, the second motor-generator and the mode change mechanism, wherein the controlling includes controlling the first motor-generator so as to reduce a reaction force acting on the first motor-generator, at a time at which a state of the one-way clutch changes from the unlocked state to the locked state, when the drive mode is changed from the start mode to the HV mode by the mode change mechanism.

\* \* \* \* \*